(12) United States Patent
Brannan et al.

(10) Patent No.: US 11,556,949 B2
(45) Date of Patent: Jan. 17, 2023

(54) TELEMATICS SERVICE DETECTION AND ACTION MESSAGING BASED ON MACHINE LEARNING FOR ASSISTING CAR SHARING PLATFORM

(71) Applicant: STATE FARM MUTUAL AUTOMOBILE INSURANCE COMPANY, Bloomington, IL (US)

(72) Inventors: Joseph Robert Brannan, Bloomington, IL (US); Ryan Gross, Normal, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

(21) Appl. No.: 17/387,583

(22) Filed: Jul. 28, 2021

(65) Prior Publication Data

US 2021/0357964 A1 Nov. 18, 2021

Related U.S. Application Data

(63) Continuation of application No. 16/269,007, filed on Feb. 6, 2019, now Pat. No. 11,107,104.

(51) Int. Cl.
*G06Q 30/02* (2012.01)
*G06N 20/00* (2019.01)
(Continued)

(52) U.S. Cl.
CPC ......... *G06Q 30/0208* (2013.01); *G06N 20/00* (2019.01); *G06Q 10/20* (2013.01);
(Continued)

(58) Field of Classification Search
CPC .... G06Q 30/0208; G06Q 10/20; G06Q 50/30; H04L 51/046; H04L 51/24; G08G 1/20; G06N 20/00
See application file for complete search history.

(56) References Cited

U.S. PATENT DOCUMENTS 9,311,271 B2   4/2016   Wright
9,633,487 B2   4/2017   Wright
(Continued)

OTHER PUBLICATIONS

"Advanced Planning for autonomous vehicles using reinforcement learning and deep inverse reinforcement learning" (You, Changxi et al., Publisehd on Jan. 15, 2019 at www.elsevier.com/locate/robot) t (Year: 2019).*

(Continued)

*Primary Examiner* — James M Detweiler
(74) *Attorney, Agent, or Firm* — Marshall, Gerstein & Borun LLP

(57) ABSTRACT

A method of causing car sharing platform user to perform vehicle actions includes training a model by analyzing historical data; analyzing a first data set to determine vehicle requirements comprising respective actions that include respective action values; displaying the actions; receiving user acceptance of the actions; analyzing a second data set to identify changes to the requirements indicating completed actions; and releasing the respective generated action value for the completed actions. A non-transitory computer readable medium containing program instructions that when executed, cause a computer system to: train a model by analyzing historical data; analyze a first data set to determine vehicle requirements comprising respective actions that include respective action values; display the actions; receive user acceptance of the actions; analyze a second data set to identify changes to the requirements indicating completed actions; and release the respective generated action value for the completed actions.

20 Claims, 6 Drawing Sheets

(51) Int. Cl.
*H04L 51/046* (2022.01)
*G08G 1/00* (2006.01)
*G06Q 50/30* (2012.01)
*G06Q 10/00* (2012.01)
*H04L 51/224* (2022.01)

(52) U.S. Cl.
CPC ............. *G06Q 50/30* (2013.01); *G08G 1/20* (2013.01); *H04L 51/046* (2013.01); *H04L 51/224* (2022.05)

(56) References Cited

U.S. PATENT DOCUMENTS

| | | | |
|---|---|---|---|
| 10,192,369 B2 | 1/2019 | Wright | |
| 10,198,879 B2 | 2/2019 | Wright | |
| 10,552,773 B1* | 2/2020 | Shah | ................ G06N 7/005 |
| 2013/0046589 A1* | 2/2013 | Grigg | ..................... G06Q 30/02 |
| | | | 705/14.1 |
| 2015/0310379 A1* | 10/2015 | Farrelly | ............. G06Q 30/0203 |
| | | | 705/7.15 |
| 2017/0300939 A1* | 10/2017 | Chittilappilly | ..... G06Q 30/0207 |
| 2018/0197349 A1* | 7/2018 | Oesterling | ............. G07C 5/008 |
| 2019/0196503 A1* | 6/2019 | Abari | ..................... G06Q 10/00 |
| 2019/0311630 A1* | 10/2019 | VanderZanden | ... G01C 21/3438 |
| 2020/0126320 A1* | 4/2020 | Tanuma | ................ G07C 5/0808 |
| 2020/0219056 A1* | 7/2020 | Fujisawa | ............ G06Q 10/0834 |

OTHER PUBLICATIONS

"Advanced Planning for autonomous vehicles using reinforcement learning and deep inverse reinforcement learning" (You, Changxi et al., Published on Jan. 15, 2019 at www.elsevier.com/locate/robot) (Year: 2019).*

* cited by examiner

TELEMATICS SERVICE DETECTION AND ACTION MESSAGING BASED ON MACHINE LEARNING FOR ASSISTING CAR SHARING PLATFORM

CROSS-REFERENCE TO RELATED APPLICATIONS

This application is a continuation of U.S. patent application Ser. No. 16/269,007, filed on Feb. 6, 2019, entitled "TELEMATICS SERVICE DETECTION AND ACTION MESSAGING BASED ON MACHINE LEARNING FOR ASSISTING CAR SHARING PLATFORM," the entire contents of which are hereby incorporated herein by reference.

FIELD OF THE DISCLOSURE

The present disclosure generally relates to a system and method of detecting vehicle imperatives and generating action messages for assisting a car sharing platform and, more particularly, to using trained machine learning models to generate action values designed to cause a user to complete an action relating to the car sharing platform.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A car sharing company may operate a car sharing platform (CSP) including a fleet of one or more vehicles generally controlled and/or monitored by the car sharing company. The vehicles' respective titles may be held by the car sharing company, and the vehicles may include any number of trucks, vans and/or other vehicles (e.g., motorcycles, buses, etc.). The vehicles may include autonomous and/or semi-autonomous features. Increasingly, telematics data related to the operation of motor vehicles of all types is captured by telematics systems that are built into vehicles, or which are carried into vehicles by drivers and passengers (e.g., mobile computing devices). Such telematics systems measure and capture data directly from vehicle computer systems as well as indirectly from the vehicle environment. In general, a car sharing company's owner does not drive the fleet of vehicles operated by the car sharing company. Rather, a customer of the car sharing company (i.e., a vehicle operator) reserves a vehicle via the CSP to drive to a destination, and then leaves (i.e., abandons) the vehicle.

In contrast, a ride sharing service may include a vehicle generally controlled and/or monitored by a ride sharing operator who owns the vehicle. The ride sharing company may provide a mechanism by which the ride sharing operator (i.e., the owner of the ride sharing vehicle) may offer rides to vehicle passengers.

Several logistical challenges face car sharing companies. First, as CSP vehicle operators reserve vehicles to take trips and then abandon those vehicles, the CSP's fleet of vehicles becomes dispersed in geographically inconvenient locations, whereupon the CSP cannot offer the abandoned vehicles to subsequent CSP customers without first relocating (e.g., retrieving) the vehicles. Retrieving the vehicles is currently performed by manually tracking the abandoned vehicles, and sending employee-drivers of the CSP to drive the abandoned vehicles back to a centralized location. The CSP may be required to employ full-time employees to relocate vehicles because the CSP lacks a means to require the customer to return the vehicle to a centralized location or to another return location that is remote from the customer's final destination, or to verify the status of the vehicle.

Second, surges in consumer demand may cause many vehicles to be needed at a particular location at a particular time, which cannot be accommodated by the CSP when the centralized location where the fleet of vehicles is kept is removed from the location wherein the consumer demand is surging.

Third, the CSP may be constantly challenged to maintain and upkeep the vehicles composing the CSP's fleet. However, the CSP may be unable to determine the state of vehicles that are abandoned because no technological mechanism currently exists to determine whether a vehicle is in need of routine service and/or service due to normal wear and tear. At present, the CSP must send a service technician to drive the vehicle to a service center, which may be remote from the customer's final destination and/or the centralized location(s) of the CSP.

BRIEF SUMMARY

In one aspect, a computer-implemented method of causing a user of a car sharing platform to perform service or relocation actions with respect to a vehicle includes: (i) training, by one or more processors, a plurality of models by analyzing historical data to generate respective action values corresponding to respective vehicle requirement types, at least one of the plurality of models trained to generate action values for non-relocation vehicle requirement types; (ii) analyzing, by the one or more processors, a first data set to determine one or more vehicle requirements, each comprising one or more respective actions, and each of the actions corresponding to a respective action value; (iii) displaying, by the one or more processors, the one or more actions to the user; (iv) receiving, by the one or more processors, an indication of acceptance of the user of at least one of the one or more actions; (v) analyzing, by the one or more processors, a second data set to identify changes to the one or more determined vehicle requirements indicating one or more completed actions; and (vi) releasing, by the one or more processors and based on the analyzing of the second data set and the acceptance of the user, the respective generated action value to the user for each of the one or more completed actions.

In another aspect, a non-transitory computer readable medium contains program instructions that when executed, cause a computer system to: (i) train, by one or more processors, a plurality of models by analyzing historical data to generate respective action values corresponding to respective vehicle requirement types, at least one of the plurality of models trained to generate action values for non-relocation vehicle requirement types; (ii) analyze, by the one or more processors, a first data set to determine one or more vehicle requirements, each comprising one or more respective actions, and each of the actions corresponding to a respective action value; (iii) display, by the one or more processors, the one or more actions to a user; (iv) receive, by the one or more processors, an indication of acceptance of the user of at least one of the one or more actions; (v) analyze, by the one or more processors, a second data set to identify changes to the one or more determined vehicle requirements indicating one or more completed actions; and (vi) release, by the one or more processors and based on the analyzing of the second data set and the acceptance of the user, the respective generated action value to the user for each of the one or more completed actions.

DETAILED DESCRIPTION

Overview

Figure 1:
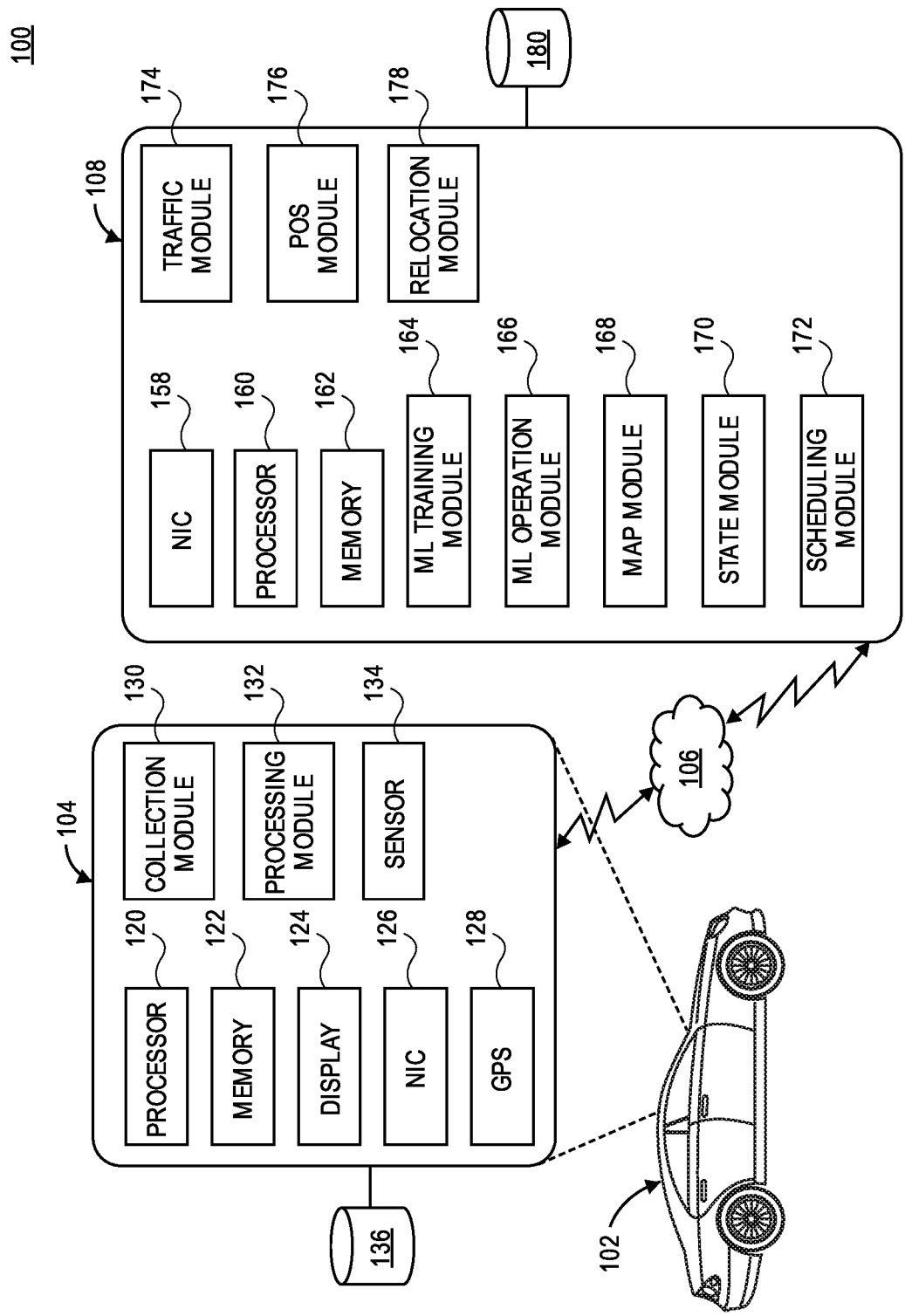
FIG. 1 depicts an example environment for implementing vehicle imperative detection and action messaging using a trained machine learning model for assisting a car sharing platform.

The present techniques include methods and systems for analyzing telematics data to detect vehicle imperatives, training and operating one or more machine learning (ML) models to generate action values, and generating and displaying action messages to cause a vehicle operator of a vehicle of a CSP fleet to perform an action relating to the vehicle on behalf of the CSP. The CSP may receive vehicle telematics data from a telematics system integral to the vehicle and/or data generated by a mobile device of the user. In general, the "user" may be driver/operator or passenger of a vehicle of a CSP. The telematics data may include a data set reflecting a plurality of features, readings, and/or statuses of the vehicle. For example, the telematics data may include driving events (e.g., engagement of a cruise control system, gas tank refueling, a braking event, etc.) that are directly measureable by analyzing telematics data. Telematics data may also include information regarding the environment of the vehicle, such as humidity, temperature, etc. Telematics data may include the mileage of the vehicle, the levels of any fluids in the vehicle (e.g., windshield wiper fluid, oil fluid, brake fluid, etc.), tire pressure, etc. that is ascertainable by a telematics system of the vehicle using the onboard sensors and computers of the vehicle. User data may include information provided by the user to a computer, such as by way of an electronic form, web site, mobile application or other computerized mechanism for entering information. For example, user data may include photographs, textual descriptions, selections of a user from a pre-programmed menu (e.g., a value of a slider widget, a Boolean entry, etc.).

The present techniques may include processing the telematics data and/or the user data using one or more trained machine learning (ML) module to identify one or more actions relating to the vehicle, wherein each action is associated with a quality (e.g., good/bad), a severity, a time-to-completion, etc. The present techniques may include analyzing the actions, a route/destination of the user using a trained ML model to generate an action value, displaying the action value to the user, and/or storing the user's responses in an electronic database. Of course, customer agreement or opt-in may be required if personal data is collected or shared. Further, after the customer provides their affirmative consent, the collection of customer data may be used to offer the customer a reward, wherein the customer's insurance premium may be adjusted based upon whether the customer takes or refrains from certain actions, such as providing a service or relocation of a vehicle, using an application to receive and respond to action messages, etc. As a result, risk-averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Example Computing Environment

FIG. 1 depicts an example environment 100 for implementing, inter alia, the generation and display of action values in a car sharing platform. The environment 100 may include a vehicle 102 associated with a telematics system 104, a network 106, and a server 108.

The vehicle 102 and the telematics system 104 are remote from the server 108 and are coupled to the server 108 via the network 106. The network 106 may include any suitable combination of wired and/or wireless communication networks, such as one or more local area networks (LANs), metropolitan area networks (MANs), and/or wide area network (WANs). As just one specific example, the network 106 may include a cellular network, the Internet, and a server-side LAN. As another example, the network 106 may support a cellular (e.g., 4G, 5G, etc.) connection to a mobile computing device of a user and an IEEE 802.11 connection to the mobile computing device. While referred to herein as a "server," the server 108 may, in some implementations, include multiple servers and/or other computing devices. Moreover, the server 108 may include multiple servers and/or other computing devices distributed over a large geographic area (e.g., including devices at one or more data centers), and any of the operations, computations, etc., described below may be performed in by remote computing devices in a distributed manner.

The telematics system 104 may include hardware and software components implemented in one or more devices permanently and/or temporarily affixed to, or otherwise carried on or within, the vehicle 102. For example, some or all of the components of the telematics system 104 may be built into the dash of the vehicle 102 or affixed elsewhere within the vehicle 102 (e.g., via an onboard diagnostics port of the vehicle 102). In an embodiment, a portion of the telematics system 104 may be implemented using a mobile computing device (e.g., a smart phone of the user). The telematics system 104 may include specialized hardware (e.g., one or more sensors) and computer-executable instructions for retrieving/receiving vehicle telematics data from the vehicle 102. In some cases, the telematics system 104 may be implemented using components of the vehicle 102 and a mobile computing device. For example, a vehicle telematics generation module may be included in the vehicle 102 and a vehicle telematics collection module may be included in a mobile computing device of the user, wherein the vehicle telematics collection module receives and/or retrieves a telematics data set from the vehicle telematics generation module. In some embodiments, some or all of the telematics system 104 may be provided by a CSP. For example, the telematics system 104 owned by the CSP may be provided to a different owner of the vehicle 102. In some embodiments, the CSP may own the vehicle 102, the telematics system 104, and the server 108.

In an embodiment, a first telematics system in the vehicle 102 may collect data and transmit the data to the server 108, while a second telematics system in the mobile computing device of the user receives user responses related to action messages displayed to the user. While FIG. 1 depicts only a single vehicle 102, the vehicle 102 may be in communication with numerous other servers similar to the server 108 via the network 106 and/or other networks. The telematics system 104 may include a processor 120, a memory 122, a display 124, a network interface 126, and a global positioning system (GPS) unit 128. The processor 120 may be a single processor (e.g., a central processing unit (CPU)), or may include a set of processors (e.g., a CPU and a graphics processing unit (GPU)). The telematics system 104 may further include one or more sensor 134 and an electronic database 136.

The memory 122 may be a computer-readable, non-transitory storage unit or device, or collection of units/devices, that includes persistent (e.g., hard disk) and/or non-persistent memory components. The memory 122 may store instructions that are executable on the processor 120 to perform various operations, including the instructions of various software applications and data generated and/or used by such applications. In the example implementation of FIG. 1, the memory 122 stores at least a telematics data collection module 130 and a telematics data processing module 132. Generally, the collection module 130 is executed by the processor 120 to facilitate collection of telematics data from the vehicle 102 and the processing module 132 is executed by the processor 120 to facilitate the bidirectional transmission of telematics data between the telematics system 104 and the server 108 (e.g., sending telematics data collected from the vehicle 102 to the server 108, receiving requests and responses relating to telematics data from the server 108, receiving/retrieving telematics and/or user data to generate and display action messages to the user to facilitate the user's performance of actions relating to the vehicle).

The display 124 includes hardware, firmware and/or software configured to enable a user to interact with (i.e., both provide inputs to and perceive outputs of) the telematics system 104. For example, the display 124 may include a touchscreen with both display and manual input capabilities. Alternatively, or in addition, the display 124 may include a keyboard for accepting user inputs, and/or a microphone (with associated processing components) that provides voice control/input capabilities to the user. In some embodiments, the telematics system 104 may include multiple different implementations of the display 124 (e.g., a first display 124 associated with the vehicle 102 and a second display 124 associated with a mobile computing device of the user).

The network interface 126 includes hardware, firmware and/or software configured to enable the telematics system 104 to wirelessly exchange electronic data with the server 108 via the network 106. For example, network interface 126 may include a cellular communication transceiver, a WiFi transceiver, and/or transceivers for one or more other wireless communication technologies (e.g., 4G).

The GPS unit 128 includes hardware, firmware and/or software configured to enable the telematics system 104 to self-locate using GPS technology (alone, or in combination with the services of server 108 and/or another server not shown in FIG. 1). Alternatively, or in addition, the telematics system 104 may include a unit configured to self-locate, or configured to cooperate with a remote server or other device(s) to self-locate, using other, non-GPS technologies (e.g., IP-based geo-location).

In some embodiments, the collection module 130 (or other software stored in the memory 122) provides functionality for collecting telematics data from the vehicle 102. If the telematics system 104 is a unit integrated in the vehicle (e.g., a head unit providing vehicle dashboard integrated navigation technology), for example, the telematics system 104 may include a hardwired connection (e.g., via a Controller Area Network (CAN) bus) to one or more other units of the vehicle 102. As another example, if the telematics system 104 is a smartphone (or smart watch, etc.), the telematics system 104 may couple to one or more units of the vehicle via a wired connection (e.g., an onboard diagnostics connection) or a wireless connection (e.g., Bluetooth, WiFi, etc.). The processing module 132 provides functionality for processing telematics data from the vehicle 102. The processing module 132 may retrieve/receive data from the collection module 132 and may transmit data to/from the database 136. The collection module 130 may collect data from the one or more sensors 134 and may store collected data in the database 136.

The sensor 134 may include one or more sensors associated with the vehicle 102 (e.g., a speedometer sensor) and/or a mobile device of the user (e.g., an accelerometer in a smartphone). The sensor may provide data (e.g., sensor readings) to applications (e.g., the collection module 130). Many types of sensors may be used, such as cameras, video cameras, and/or microphones. In some embodiments, sensors may read the speedometer, engine warning lights (if any), oil pressure, wiper fluid level, oil temperature, emission readings, etc. Of course, some of the telematics data created by sensors may not be visible to/accessible by the vehicle operator.

The database 136 may be any suitable database (e.g., a structured query language (SQL) database, a flat file database, a key/value data store, etc.). The database 136 may include a plurality of database tables for storing data according to data storage schema. The database 136 may include relational linkages between tables, and may allow complex data types such as time series data to be stored and queried.

The server 108 includes a network interface 158, a processor 160, a memory 162, an ML training module 164, an ML operation module 166, a map module 168, a state module 170, a scheduling module 172, a telematics processing module 174, a traffic module 176, and a database 180. The network interface 158 includes hardware, firmware and/or software configured to enable the server 108 to exchange electronic data with the telematics system 104 via network 106. For example, network interface 158 may include a wired or wireless router and a modem. The processor 160 may be a single processor (e.g., a central processing unit (CPU)), or may include a set of processors (e.g., a CPU and a graphics processing unit (GPU)).

The memory 162 is a computer-readable, non-transitory storage unit or device, or collection of such units/devices, that may include persistent (e.g., hard disk) and/or non-persistent memory components. The memory 162 may store data generated and/or used by the ML training module 164, the ML operation module 166, the map module 168, the state module 170, the scheduling module 172, the telematics processing module 172, and/or the traffic module 176, for example.

The ML training module 164 is generally configured to load, create, train, and/or store ML models for use by the server 108. For example, the ML training module 164 may include instructions for training a first ML model by analyzing telematics data received from a client (e.g., a stream of telematics data collected from the vehicle 102 or similar vehicles) to identify an action value for display to a user. Multiple different models may be developed to suit different action value types, such as current purchase discounts, future purchase discounts, a credit-based system, etc.

A training data set may include historical data. For example, the historical data may include vehicle type (e.g. make, model, general category, etc.), "miles until service" mileage of a vehicle (e.g., the next-service mileage less current mileage), distance to service station, discounted rental in hours, discounted rental in percentage off, and/or action description. Each historical datum may include an indication of whether or not the car sharing customer accepted a previously offered discount/bonus. The ML training module 164 may include instructions for training a model using the historical data, such that given a vehicle type, current mileage, distance to service station, etc., the model may predict a minimum action value in terms of discounted rental denominated in hours or percentage off that the customer would be willing to accept to perform a particular action. The ML operation module 166 may be used to load and operate models trained by the ML training module 164. The historical data may include labels such as "accepted" or "not accepted" indicating whether a particular action value was accepted by a particular customer. A model may be trained and subsequently selected for use in analysis based on similar user characteristics. For example, a model for vehicle operators between the ages of 20 and 30 may be trained, and used to analyze whether drivers within the age range are likely to accept or reject a particular action value.

The ML training module 164 may train one or more ML models to approximate functions. The ML models may be trained to accept a plurality of inputs, which may include inputs in the telematics data 104 and from other sources (e.g., user data). For example, in some embodiments, the ML training module 164 may be trained using historical data (e.g., telematics data, user data, etc.) retrieved/received from the database 180). In general, the ML training module 164 may train models by, inter alia, establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction. In another embodiment, a Bayesian model may be used to train the ML model.

In an embodiment, the trained ML model may include an artificial neural network (ANN) having an input layer, one or more hidden layers, and an output layer. Each of the layers in the ANN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of ANNs are possible.

In an embodiment, the input layer may correspond to input parameters that are numerical facts, such as the number of miles until an oil change is required, a number indicating whether a user accepted an offer, etc. The input layer may correspond to a large number of input parameters (e.g., one million inputs), in some embodiments, and may be analyzed serially or in parallel. Further, various neurons and/or neuron connections within the ANN may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction or an expected value. In some embodiments and/or scenarios, the output layer includes only a single output. For example, a neuron may correspond to one of the neurons in the hidden layers. Each of the inputs to the neuron may be weighted according to a set of weights $W_1$ through $W_i$, determined during the training process (for example, if the neural network is a recurrent neural network) and then applied to a node that performs an operation $\alpha$. The operation $\alpha$ may include computing a sum, a difference, a multiple, or a different operation. In some embodiments weights are not determined for some inputs. In some embodiments, neurons of weight below a threshold value may be discarded/ignored. The sum of the weighted inputs, $r_1$, may be input to a function which may represent any suitable functional operation on $r_1$. The output of the function may be provided to a number of neurons of a subsequent layer or as an output of the ANN.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. For instance, machine learning may involve identifying and recognizing patterns in existing text or voice/speech data in order to facilitate making predictions for subsequent data. Voice recognition and/or word recognition techniques may also be used. Models may be created based upon example inputs in order to make valid and reliable predictions for novel inputs. Additionally or alternatively, the machine learning programs may be trained by inputting sample data sets or certain data into the programs, such as drone, autonomous or semi-autonomous drone, image, mobile device, vehicle telematics, smart or autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

The ML training module 164 may load a model trained by the ML training module 164 from the database 180. For example, the ML training module 164 may load a trained ML model and pass a series of parameters to the trained ML module to identify a minimum action value likely to motivate a customer to accept an action, or to identify those customers likely to accept a particular action value with respect to a particular vehicle. In some embodiments, the ML operation module 166 may be called by another module, such as the scheduling module 172. The ML operation module 166 may process inputs produced by other modules, such as the map module 168.

The map module 168 is generally configured to obtain and determine geographic information relating to the telematics data generated by the telematics system 104. For example, the telematics system 104 may produce telematics data including location data that is received by the server 108. The map module 168 may analyze the location data to determine a GPS coordinate of the vehicle 102. The map module 168 may include functionality for matching a material need to a particular location. For example, the map module 168 may include instructions for associating an item (e.g., wiper fluid) to a particular set of merchants (e.g., a gas station, a big box store, a pharmacy, a grocer, etc.). The map module 168 may rank the set of merchants according to lowest cost of the item, closest distance to the vehicle 102, etc. Thus, the server 108 may provide the location data including the GPS coordinate 102 and an item related to an action to the map module 168, and the map module 168 may then determine a location from which the item may be retrieved and/or purchased based on the input. In an embodiment, the map module 168 may select from a set of merchants having a prepaid account of the CSP, so that the operator of the vehicle may merely pick up the needed item and not be required to purchase the item. In an embodiment, the vehicle may include a barcode or other identifier (e.g., a prepaid credit card) that may be used by the vehicle operator to make authorized purchases. The map module 168 may receive information regarding particular material needs from another component, such as the state module 170.

The state module 170 may include a virtual model of the vehicle. For example, the virtual model of the vehicle may include a set of statuses corresponding to physical attributes of the vehicle, wherein each status in the set of statuses corresponds to a value. Each corresponding value may include a Boolean indicator (e.g., YES/NO, TRUE/FALSE, REFILL/OK, DAMAGED/OK, etc.) and/or a scalar value (e.g., a value from −1.0 to +1.0, a grading according to a set of values A-F, etc.). The state module 170 may include instructions for setting the values of the virtual model according to information received from other components. For example, the state module 170 may receive processed telematics data from the telematics processing module 174, which may include user data, in some embodiments. The state module 170 may update values of the virtual model based on intrinsic telematics data and/or extrinsic telematics data.

In general, intrinsic telematics data (ITD) may include data that is directly ascertainable from the telematics data provided by the telematics system 104. For example, "WIPER_FLUID=29%" is an example of ITD. Therefore, the state module 170 may update the virtual model to set a value (e.g., "WIPER_FLUID=REFILL", "WIPER_FLUID=LOW", "WIPER_FLUID=D", etc.). Extrinsic telematics data is that data which is ascertainable by analyzing the telematics data provided by the telematics system 104. For example, the current mileage (M) of the vehicle may be included in the telematics data, along with the Vehicle Identification Number (VIN) of the vehicle. The state module 170 may not be able to determine given only the ETD (e.g., M and VIN) whether the vehicle is due for an oil change. Therefore, the state module 170 may query an electronic database 180 to obtain a virtual model of the vehicle 102 including additional information using the VIN as a parameter, wherein the retrieved information includes, for example, the last oil change mileage, recommended service mileage, etc. The state module 170 may then update the values of the virtual model based on the results of the query. For example, the state module 170 may update the virtual module to include an indication that an oil change is due in a given number of miles. The state module 170 may return the virtual model of the vehicle 102 to other modules, such as the scheduling module 172.

The scheduling module 172 is generally responsible for coordinating communication between components in the server 108, and/or between the telematics system 104 and the server 108. For example, as noted, the scheduling module 172 may call into other modules (e.g., instructions in the scheduling module 172 may have a function call interface to instructions in other modules in the server 108). The scheduling module 172 may maintain a global list of vehicles of the CSP. The database 180 may store the global list. The scheduling module 172 may update the global list in response to detecting an event (e.g., a vehicle reaching a final destination) by analyzing the telematics data or the user data (e.g., a user's indication that a vehicle is in a particular state). The scheduling module 172 may update the global list periodically (e.g., in response to a timer). For example, the scheduling module 172 may cause the state module 170 to update the respective value of every vehicle in the global list of the CSP periodically (e.g., every 10 minutes, once per hour, etc.). The scheduling module 172 may retrieve and/or receive telematics data from the telematics system 104, wherein the telematics data may have been processed by the processing module 132. The scheduling module may retrieve/receive a virtual model corresponding to the vehicle 102 from the state module, indicating the scaled or Boolean values associated with the virtual model.

For example, the scheduling module 172 may retrieve a virtual model corresponding to the vehicle 102 which indicates that the vehicle 102 is in need of one or more types of service. The scheduling module 172 may interrogate the retrieved virtual model to learn which, if any, services are needed, and the respective priority of such services. In an embodiment, the scheduling module 172 may include one or more threshold values indicating the urgency of service with respect to a particular value of the virtual model. For example, the scheduling module 172 may include a list such as OIL_CHANGE_THRESHOLD=[1000, 500, 250, 100]. When the virtual model indicates that an oil change is required in 1000 miles from the current mileage (e.g., OIL_CHANGE=5000, CURRENT_MILEAGE=4000), the scheduling module 172 may assign a low priority to the needed service. As the CURRENT_MILEAGE increases beyond the respective threshold values, the scheduling module 172 may assign a higher priority to the needed service. The scheduling module 172 may store the service priority in association with each respective value of the virtual model. The scheduling module 172 may retrieve/receive traffic information from the traffic module 174.

The traffic module 174 may include an application programming interface (API) or other computerized facility for retrieving real-time traffic data, predicted traffic data, and/or historical traffic data. For example, the traffic module 174 may accept a parameter corresponding to a geographic location (e.g., a place name, GPS coordinate, etc.) and may return traffic conditions corresponding to that geographic location. The traffic information may be encoded in a proprietary or standard mapping format (e.g., in an OpenStreetMap format). A module of the server 108 may overlay the traffic information received/retrieved from the traffic module 174 in a map displayed to a user (e.g., via the display 124).

The database 180 may be any suitable database (e.g., a structured query language (SQL) database, a flat file database, a key/value data store, etc.). The database 180 may include a plurality of database tables for storing data according to data storage schema. The database 180 may include relational linkages between tables, and may allow complex data types such as time series data to be stored and queried. For example, as noted, the database 180 may be used to store the global list of vehicles and the virtual model of each vehicle. The database 180 may therefore include a reflection of the current state of each vehicle in the CSP's fleet of vehicles.

The database 180 may be configured to store a practically unlimited amount of historical information related to each vehicle, so that the database 180 may be queried to determine the status of each vehicle in the global list of vehicles at any point in time. Although this disclosure describes a global list of vehicles, in some embodiments, one or more sublists of vehicles may be created in the database which may allow the environment 100 to more effectively organize one or more CSP vehicle fleets. Any of the modules of the server 108 may access the database 180 to create, read, update, and delete information.

Additional Module Embodiments

Some modules may receive/retrieve information from systems other than the telematics system 104. For example, the point-of-sale (POS) module 176 may receive information from a point-of-sale system (not depicted) and enter that information into the database 180 (e.g., the user's name/identity, the user's driver license information, the user's demographic information, the user's billing and payment information, etc.). The point-of-sale system may be implemented as, for example, a terminal located at a CSP pick-up location, or a web server that receives customer self-service online reservation requests. The POS module 176 may cause the database 180 to reflect information pertaining to the user's trips (e.g., a pick up and drop off location as agreed in the CSP contract with the user). As noted, the database 180 may include linkages between tables. Modules of the server 108 may establish such linkages by, for example, establishing primary key relationships. Therefore, the database 180 may include an explicit or implicit linkage allowing a query to determine relational information about the vehicle fleet, including without limitation 1) the location of each vehicle in the fleet, 2) whether the vehicle is currently checked out by a user/customer of the CSP, 2) when the user/customer of the CSP checked out the vehicle, etc. Information entered into the database 180 by the POS module 176 may be received/retrieved by other modules, such as the scheduling module 172.

Some modules may update vehicle state by referencing historical traffic data pattern data. In yet another embodiment, the server 108 may include a relocation module 178 that analyzes historical vehicle traffic pattern data included in historical telematics data, or from a third-party traffic congestion data API, in conjunction with historical car sharing supply and demand data of the CSP. The relocation module 178 may determine by analyzing one or both of historical traffic data and supply/demand data that vehicles are likely to be needed in a particular area at a given time. Demand may be identified by reference to cyclical and/or seasonal schedules, which may be encoded by the scheduling module 172 (e.g., back-to-school schedules for colleges in a particular area, sporting event schedules, etc.). The relocation module 178 may be programmed to modify the virtual model associated with a vehicle to include a relocation flag, including a parameter specifying the location to which the vehicle is to be relocated.

For example, on the first of each given month (e.g., August), the relocation module 178 may include instructions that, when executed, cause the server 108 to retrieve a historical data set for a time period (e.g., the previous five years) for the given month in a particular area. The relocation module 178 may analyze the historical data set to determine the highest demand periods by the number of requests for new reservations, and may use a geo-location algorithm to create a heat map (e.g., a radius around a point) for the demand. When the relocation module 178 detects a trend over a majority of the time period (e.g., in three of the last five years), the relocation module 178 may then determine a predicted number of vehicles that are needed on each day of the month, based on the demand. For example, the relocation module 178 may determine that on the first seven days of the month of August, 40, 32, 36, 38, 52, and 95 vehicles have been requested around a particular point on average over the period of time, and that this represents higher than normal demand. The relocation module 178 may analyze the types of vehicles that were requested during this demand period, and create a list of vehicle types needed per day. The relocation module 178 may then update the virtual model of a corresponding vehicle in the global list of vehicles. That is, continuing the example, the relocation module 178 may flag 40 vehicles in the global list of vehicles for relocation to the point of high demand on the first day of August of the current year, 32 on the second day and so on. It should be appreciated that the formula used by the relocation module 178 for determining the number of cars needed for relocation purposes may take other information into account, such as overall business trends, and may be subject to human review. The relocation module 178 may also include instructions for comparing the fuel cost of relocation to the expected profit, and may only flag a vehicle for relocation if the expected profit for moving the vehicle exceeds the cost of allowing the vehicle to sit idle by a pre-set margin (e.g., 10%).

The computer-implemented methods discussed herein may include additional, fewer, or alternate actions, including those discussed elsewhere herein. The methods may be implemented via one or more local or remote processors, transceivers, servers, and/or sensors (such as processors, transceivers, servers, and/or sensors mounted on drones, vehicles or mobile devices, or associated with smart infrastructure or remote servers), and/or via computer-executable instructions stored on non-transitory computer-readable media or medium.

In operation, the computing environment 100 may receive data from the vehicle 102, the telematics system 104, and process that data using the server 108 to allow the CSP to, inter alia, incentivize a user to complete actions/goals relating to the CSP. In one embodiment, the server 108 may analyze a global list of vehicles, wherein analyzing the global list of vehicles includes interrogating a virtual model associated with each vehicle in the global list of vehicles. For example, the list may include 1000 or more vehicles, each of which is associated with a virtual model denoting a particular status, which may indicate one or more vehicle imperatives (e.g., a service-related need, a relocation need, a vehicle recall need, etc.).

For example, a brand new vehicle may include a virtual model that indicates no required service. On the other hand, a vehicle that has been in service of the CSP for a time (e.g., for one year) may require periodic service throughout the year, in addition to service arising from normal wear and tear, accidents, etc. In another embodiment, rather than analyzing every vehicle in the list of vehicles, the server 108 may analyze a particular vehicle in response to the presence of one or more conditions (e.g., an action of the user, a particular datum the server 108 detects by analyzing the telematics data, the passage of time, etc.).

By analyzing the list of vehicles comprising the CSP's fleet, and the vehicles' respective virtual models, the server 108 may detect an imperative (e.g., service, relocation, etc.) for one or more of the vehicles and, based on that detection, use a pre-trained ML model to determine an action value to provide to a user to perform a action addressing the imperative(s), either directly or indirectly. Determining the action value to provide to the user may include analyzing information regarding the vehicle 102, the user and/or other information (e.g., traffic data from the traffic module 176) using the trained ML model to obtain a minimum value likely to successfully incentivize the user to satisfy the imperative(s) related to the vehicle 102. In general, imperatives relating to the status of vehicles may be prioritized and may include minor, major, routine, and/or wear and tear maintenance issues. As discussed below, relocation imperatives may be added to the virtual model by another module. It should be appreciated that the type of imperative (e.g., service, relocation, recall, etc.) may determine which ML model is selected to generate an action value. For example, a first ML model may be trained for relocation actions, whereas a second ML model may be trained for determining action values with respect to service-based actions. Additionally, service-based actions that the user can perform without moving the vehicle (e.g., cleaning the vehicle) may be analyzed using a different ML model than actions requiring the user to transport the vehicle to a service center.

For example, the scheduling module 172 may receive telematics data of a late model sedan. The scheduling module 172 may pass the telematics data to the state module 170. The state module 170 may analyze the telematics data and in so doing determine that the telematics data corresponding to the late model sedan indicates low tire pressure of a front left tire of the late model sedan (i.e., a service imperative requiring the user to locate a service station). Based on the low tire pressure indication, the state module 170 may update the virtual model corresponding to a late model sedan to indicate the low tire pressure. For example, the minimum pounds per square inch (PSI) may be 32PSI, whereas the telematics data indicates a PSI of 30. The state module 170 may increment a counter included in the virtual model to indicate the presence of a need for service and may associate a priority (e.g., "LOW") with the PSI value. The state module 170 may include instructions for determining the priority by analyzing a facet of the errant value, such as a deviation from a minimum associated with the measured quantity on a per-vehicle basis. In the example, a PSI of 10 could, for example, result in a priority designation of "CRITICAL."

The state module 170 may update virtual models as telematics data is received, resulting in the global list of vehicles and associated virtual models always reflecting the most current status of the entire fleet of vehicles. Furthermore, the scheduling module 172 may query the global list of vehicles, in real time, to determine, for example, which vehicles require service, relocation, or other imperatives. The virtual model may include other information such as a timestamp of when the service need was discovered by the state module 170, the subsystem or major component of the vehicle affected by the service need, whether the service need was caused by an accident or damage to the vehicle, whether the service need relates to a functional or a cosmetic quality of the vehicle, etc. Thus, the scheduling module 172 may sort and rank the list of vehicles according to other useful and suitable criteria, including without limitation 1) the length of time that the service/relocation has been needed, 2) the severity/priority of the service/relocation need, 3) the subsystem or major component affected by the service, etc. The sorting and ranking may occur frequently (e.g., every second, every minute, every hour, etc.) during the operation of the computing environment 100, and the computing environment 100 may take actions based on the sorting and ranking which are asynchronous with respect to both the collection and analysis of telematics data. That is to say, in some embodiments, the computing environment 100 may simultaneously perform data collection, data analysis, and dispatch functions (e.g., using multiprocessing and/or multithreaded computer programs).

Although only one vehicle 102 is depicted in FIG. 1, any number of vehicles 102 can be supported by the computing environment 100. Furthermore, the vehicles may be of homogenous type (e.g., passenger cars, recreational vehicles, tractor-trailers, motorcycles, etc.). In an embodiment, the computing environment 100 may be packaged and sold to a second party operator of a CSP for use with the second party's fleet of vehicles. The computing environment 100 may include a fleet management graphical user interface (GUI) for entering fleet information into the database 180 (not depicted). In an embodiment, the fleet management GUI allows the operator of the computing environment 100 to add, remove, and update the global list of vehicles comprising a fleet.

Once the scheduling module 172 receives the telematics data, the ML training module 164 may have already trained one or more ML models, and the ML operation module 166 may have already loaded those trained models into the memory 162. To continue the above example, once the state module 170 updates the state module to indicate a low priority service need relating to tire pressure, a module querying the list of vehicles may discover that service need. For example, the scheduling module 172 may query the database 180 to obtain a list of vehicles requiring service. The result of the query may include the late model sedan, with the low front left tire pressure issue. At this point in the operation of the system, the scheduling module 172 may parameterize a data structure corresponding to the inputs of a trained model. In some embodiments, parameterizing the data structure may include joining one or more data sets into an input data set. For instance, the scheduling module 172 may include instructions for retrieving/receiving user information and vehicle information from the database 180.

As noted above, user information may be linked to vehicle information. Continuing the above example, the scheduling module 172 may combine vehicle data retrieved from the data base 180 (e.g., make, model year, mileage, etc.) with user information (e.g., age of the user, destination of the user), real-time telematics data received from the telematics system 104 (e.g., a route programmed into the GPS 128 of the vehicle 102), and/or an indication of the type of service needed to generate the input data set. As noted above, the input data set may be annotated with additional information relating to service, such as: a cost of service, a distance to service station, etc. in accordance with the input parameters of one or more of the trained ML models.

Once the scheduling module 172 has determined a vehicle imperative and generated the input data set, the scheduling module may pass the input data set to the ML operation module 166. The ML operation module 166 may perform additional preprocessing of the input data set (e.g., validation of individual inputs). As noted, in the above example, the ML operation module 166 may select and operate a particular ML model based on the imperative type (i.e., service requiring a service station). The ML operation module 166 may then apply the inputs to the trained ML model to execute the model and return the result of the execution of the model to the scheduling module 172. As noted, the ML operation module 166 may be executed in a parallel thread or process, so as to allow the computing environment 100 to continue to process telematics input without interruption. In various embodiments, the output of the ML operation module 166 may be an action value in the form of a dollar value (e.g., $12), a discount percentage (e.g., 0.10), or an indication of no action value/discount.

When the action value is nonzero, the scheduling module 172 may include instructions for transmitting an action message including the action value and an action description to the user. The action message may include an action name, an estimated time to complete the action, a mileage detour required to complete the action, and one or more action values. Transmitting the action value to the user may include causing a push message, an SMS message, an email, or other form of asynchronous communication to the user. The scheduling module 172 may query the database 180 to determine an appropriate contact point of the user (e.g., a device identifier, a telephone number, an email address, etc.). In some embodiments, the scheduling module 172 may include instructions for determining whether the user is currently driving, by analyzing the telematics data, and may defer transmission of the message until a time that the driver has come to a stop. A message queue and deferred message module may be used to implement such delayed messaging functionality (not depicted).

In an embodiment, the action message including the action value may be displayed to the user via a native application. For example, a user of a mobile computing device such as an iPhone, Android, or other smart phone device may download an application of the CSP that includes messaging functionality. In general, the application may display messages from the CSP and collect input of the user in a variety of suitable ways, as described below. In particular, the telematics system 104 may include instructions for displaying the action message to the user, via a suitable display stack such as an application executing in a smart phone, a web browser, etc. Action messages, which are described in more detail below, may be sent, revoked, and/or updated by the scheduling module 172 via the network 106 to the telematics system 104. For example, the value in credits may be updated when the scheduling module 172 sends an update action message. The telematics system 104 may include instructions for receiving an indication from the user as to whether or not the user accepts a given action, recording the response of the user in the database 180, and performing additional actions (e.g., notifying a service center, releasing a payment, issuing a discount or promotional code, etc.) based on the user's response and/or additional telematics data received by the server 108.

Example Graphical Interactive User Interface for Displaying an Action Message

Figure 2:
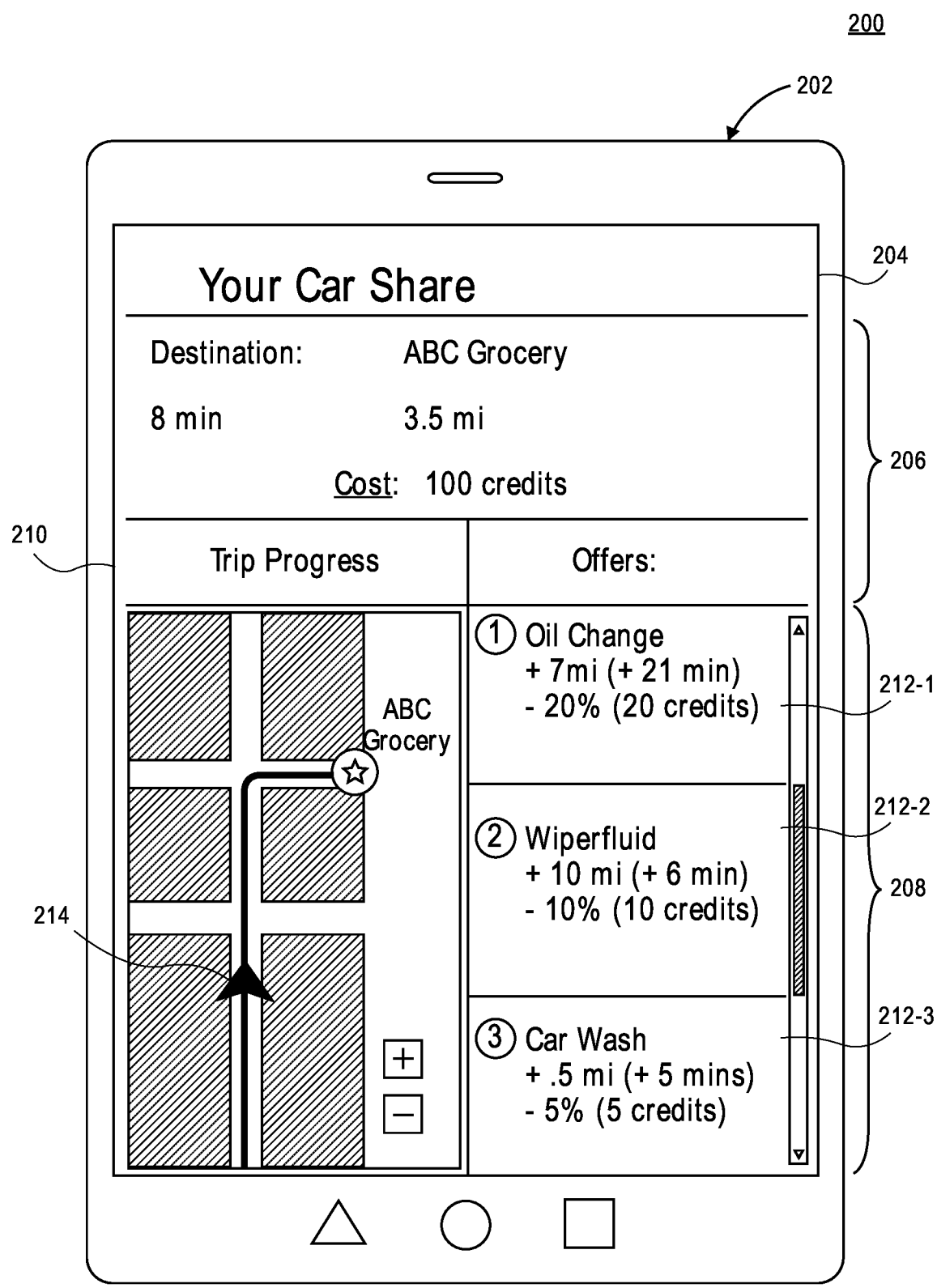
FIG. 2 depicts an example interactive user interface for displaying vehicle operator action messaging and receiving user acceptances for assisting a car sharing platform.

FIG. 2 depicts a computing environment 200 for displaying vehicle operator action messages and collecting user input. Computing environment 200 includes a device 202 that includes a display screen 204. The device 202 may correspond to a mobile computing device of the user, such as a smart phone, tablet, etc. In some embodiments, the device 202 may be a laptop or other suitable connected computing device. In still further embodiments, the device 202 may be a device of the CSP that is integral to the vehicle 102, such as a display built into the dash of the vehicle 102. In embodiments, the device 202 may correspond to the telematics system 104, in whole or in part. For example, the device 202 may implement a portion of features of the telematics system 104 (e.g., the display 124 may correspond to the display screen 204) while other portions of the telematics system 104 are implemented by a second device that is integral to the vehicle 102. The device 202 may include a memory corresponding to the memory 122 including instructions (e.g., an application) which when executed, causes the screen 204 to display information and to receive inputs of the user.

The screen 204 may display a trip description region 206 that includes information corresponding to the user's current use of the vehicle 102, and an offers region 208 that includes one or more action messages corresponding to actions generated by the server 108 for display to the user. For example, the trip description region 206 may display a destination, a mileage to arrival, estimated time of arrival, and cost in credits, dollars, or other denomination of the user's current trip. The screen 204 may include a trip progress window 210 and current user location 214, both of which may be generated by the map module 168 of FIG. 1, based on the user's GPS location as provided to the server 108 by the GPS 128.

The offers region 208 may include one or more action messages. For example, FIG. 2 depicts an action message 212-1, prompting the user to take the vehicle 102 for an oil change, an action message 212-2 prompting the user to add wiper fluid to the vehicle 102, and an action message 212-3 prompting the user to take the vehicle 102 through a car wash. Each of the respective action messages 212-1 through 212-3 include a action name, an estimated action completion time, a action detour, and a discount expressed as a percentage of the user's CSP purchase price and number of credits. Of course, in some embodiments, the particular arrangement and style of actions may be altered to suit different ML models: as noted above, multiple ML models may be developed to address different economic schemes, such as a discount model, a credit model, etc., and depending on which type of model is in use, the display of the offers region 208 and action messages therein may differ accordingly. Furthermore, the action messages may be displayed according to information that is not displayed to the user, such as the likelihood that the user will accept the action, a priority of the action with respect to the safety/integrity of the vehicle 102, and/or the cost to the CSP/discount to the user for performing the action. The action messages may include an trigger for display/hiding that is based on time (e.g., the action message 212-1 may be set to never expire), distance (e.g., only display the action 212-2 may only be displayed when the user is within 2.0 miles of a particular gas station partner of the CSP), and/or other criteria (e.g., display 212-3 until the user drives in a rainy area, as determined by scheduling module 172 analyzing a weather data API and/or humidity information from the telematics data).

It should be appreciated that the screen 204 may display information that appears to the user to be relatively static throughout the user's trip from one place to another in the vehicle 102, such as the trip description region 206, in addition to information that is highly dynamic through the trip, such as the trip progress window 210 and the offers region 208. In some embodiments, the device 202 may transmit the vehicle 102's location and/or receive mapping information from the server 108 in real time or with very low latency (e.g., every 10 ms) throughout a trip via the network 106, causing the user to perceive the trip progress window 210 as being continuously updated throughout the trip. Furthermore, the device 202 may transmit telematics data read from the systems of the vehicle 102 to the server 108 in real time or near-real time, allowing the server 108 to analyze the telematics data and dynamically provide action messages in the offers region 208 of the screen 204 throughout the user's trip. In general, the screen 204 passively displays action messages generated by the scheduling module 172 to the user through the user's trip, including a cost minimized by the trained ML model that is likely to motivate the user to accept the action. In some cases, the scheduling module 172 may include an action half life, wherein the action reduces in value over time until it reaches zero.

In keeping with the computing environment 100, the computing environment 200 may include safeguards preventing the user's interaction with the screen 204 while the vehicle 102 is in motion. For example, instructions executing in the device 202 may disable touch input of the screen 204 and/or delayed/defer the display of action messages while the vehicle is in motion.

The user may accept or reject an action. For example, in the depicted embodiment of FIG. 1, the user may access the display screen 204 using touch or other suitable input methods (e.g., a digital tablet pen). The user may zoom, scroll, and pan about the display screen 204 using single-digit or multi-digit touch gestures. For example, to accept an action, the user may swipe on one of the action messages in the offers region 208 from right to left, and to reject an action, the user may swipe on one of the messages from left to right. The device 202 may include instructions for processing such inputs of the user and transmitting action acceptance/rejection messages to the server 108. The scheduling module 172 may receive such messages and record the user's response in the database 180. As noted above, an action message may be displayed to the user via other mechanisms, such as push notifications.

Figure 3:
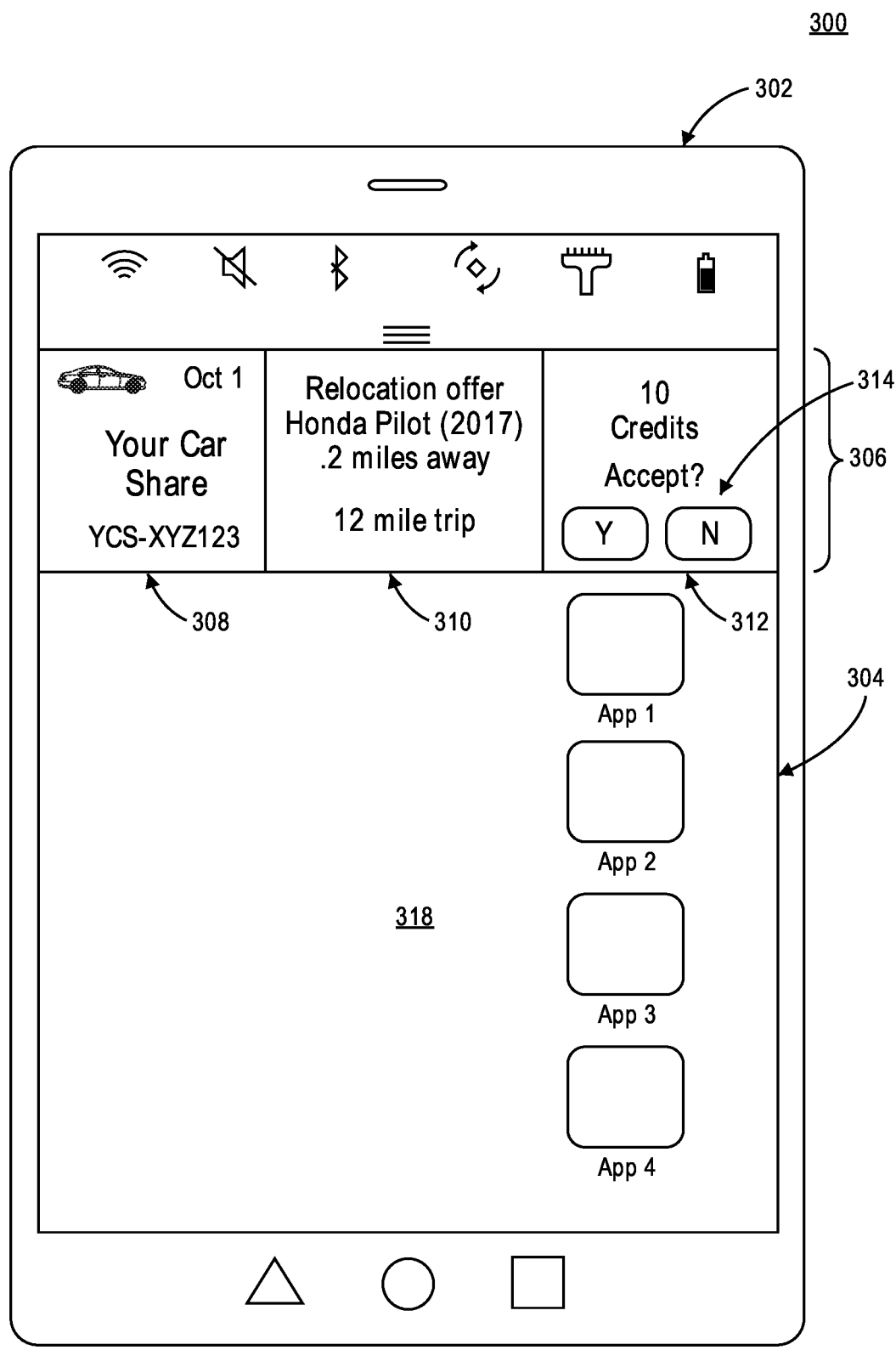
FIG. 3 depicts an example interactive user interface for displaying a notification of a action message including a vehicle relocation action on behalf of a car sharing platform via an interactive user interface, according to an embodiment.

Example Interactive Push Message User Interface for Displaying an Action Message FIG. 3 depicts an example computing environment 300 for displaying a push vehicle action message and collecting user input. An advantage of using a push message in the environment 300 is that the user will be instantaneously notified of opportunities to complete actions on behalf of the CSP without acting (e.g., without opening an application and manually checking for the presence of such opportunities). The environment 300 includes a computing device 302, which may correspond to the computing device 202 of FIG. 2. The computing device 302 includes a screen 304. The screen 304 includes a push notification 306 that may appear atop a background 318 when a lock screen of the device is disengaged (i.e., when the user types in a passcode or touches a pattern unlock that is part of the operating system of the device 302). The screen 304 may correspond to the screen 204 of FIG. 2, in some embodiments.

The push notification 306 includes a CSP information region 308, including information relating to the user's purchase of car sharing time from the CSP. The car sharing region may include information uniquely identifying the car sharing purchase (e.g., an order code), an image of the vehicle 102, and a date of the car sharing purchase. The push notification 306 includes an action message 310, like the action messages 212-1 through 212-3 of FIG. 2. However, in FIG. 3, a different action type is offered to the user (i.e., a relocation action). The action message 310 includes a textual description of the action, a description of the vehicle in need of relocation, a distance to the vehicle in need of relocation, and a description of the distance the vehicle in need of relocation must be moved. The push notification 306 includes an acceptance region 312, wherein the user may explicitly accept or reject the action offer by pressing a yes/no button 314. The push notification 306 may include instructions that, when executed, cause the device 302 to receive an indication of the user's acceptance, and call a callback function or other facility for communicating the user's identity, the order code, and the indication of acceptance to a remote computing system (e.g., the server 108).

Once the remote computing system receives the callback, the remote computing system may create an electronic record of the user's acceptance in an electronic database (e.g., the database 180) and transmit a confirmation of acceptance to the user (e.g., via another push message, an email, etc.). The confirmation message may include parameters, for example that the action must be completed within 30 minutes. The remote computing system may include instructions for periodically (e.g., every 30 seconds) monitoring the action to determine whether the user has completed the action. The remote computing system may monitor telematics information provided by the vehicle to be relocated to determine whether the vehicle to be relocated has been moved to the correct location. In some embodiments, the vehicle to relocate may correspond to the vehicle 102, and may include capabilities for determining location such as the GPS 128. Once the vehicle has been relocated as agreed, the remote computing system may update a virtual model corresponding to the relocated vehicle, and may issue credit, a discount, or other reward to the user. The user may view the user's account in an account management application.

Additional Example User Interface Embodiments for Car Sharing Platform

Figure 4:
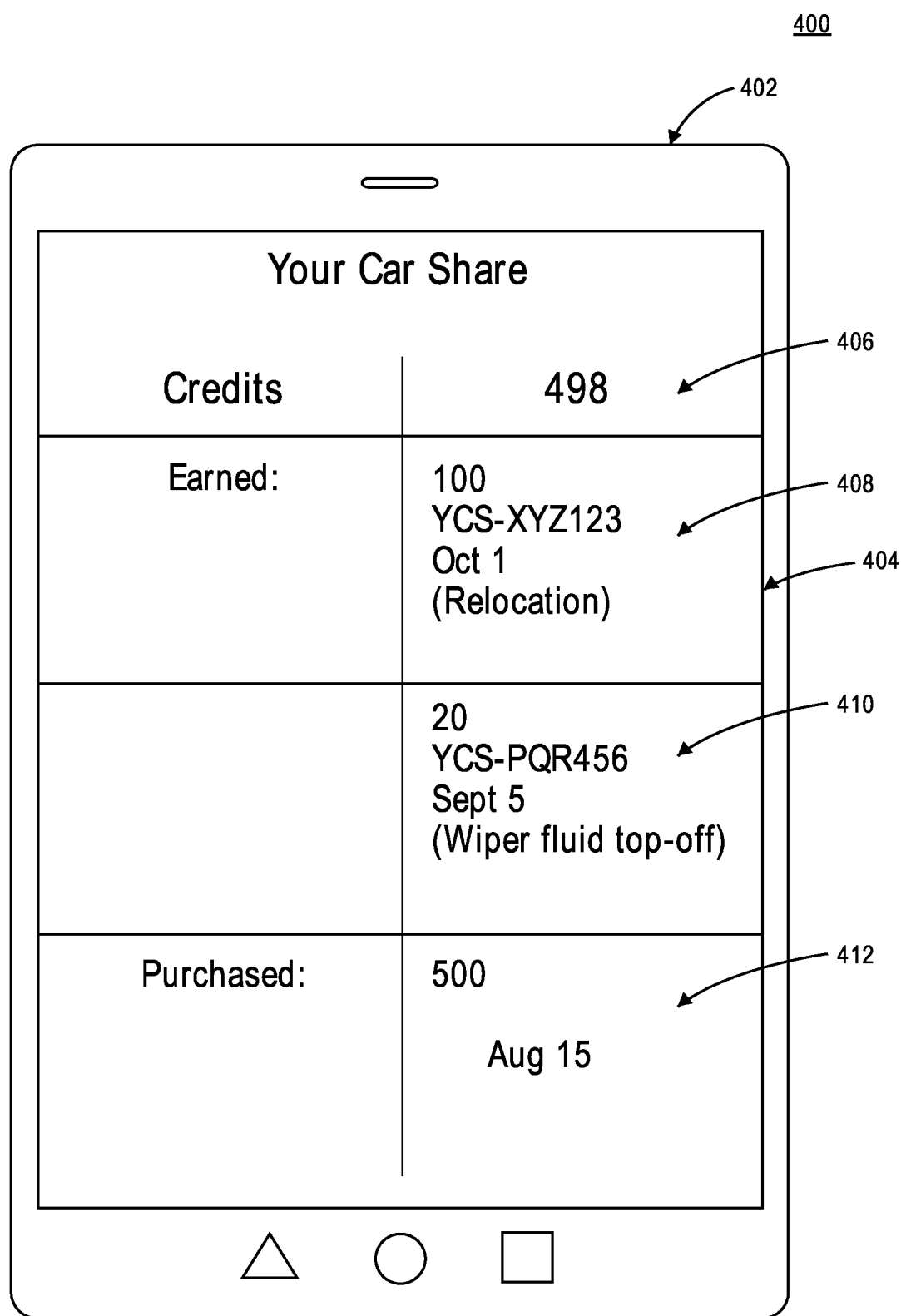
FIG. 4 depicts an example user interface for displaying car sharing platform account credits.

FIG. 4 depicts an example computing environment 400 for displaying car sharing platform account credits, according to an embodiment. The environment 400 includes a computing device 402, which may correspond to the computing device 302 of FIG. 3. The device 402 includes a screen 404, which may correspond to the screen 304 of FIG. 3. The screen 404 displays a credits total 406, a first credit reward 408, a second credit reward 410, and a credit purchase 412. The first credit reward 408 corresponds to a relocation action, in particular the relocation action depicted in the push message example of FIG. 3. The second credit reward 410 corresponds to a wiper fluid top-off action completed in the prior month, for which 20 credits were earned. The screen 404 may be presented to a user in a car sharing application, and the car sharing application may include additional screens and/or menus, such as a car share rating.

Figure 5:
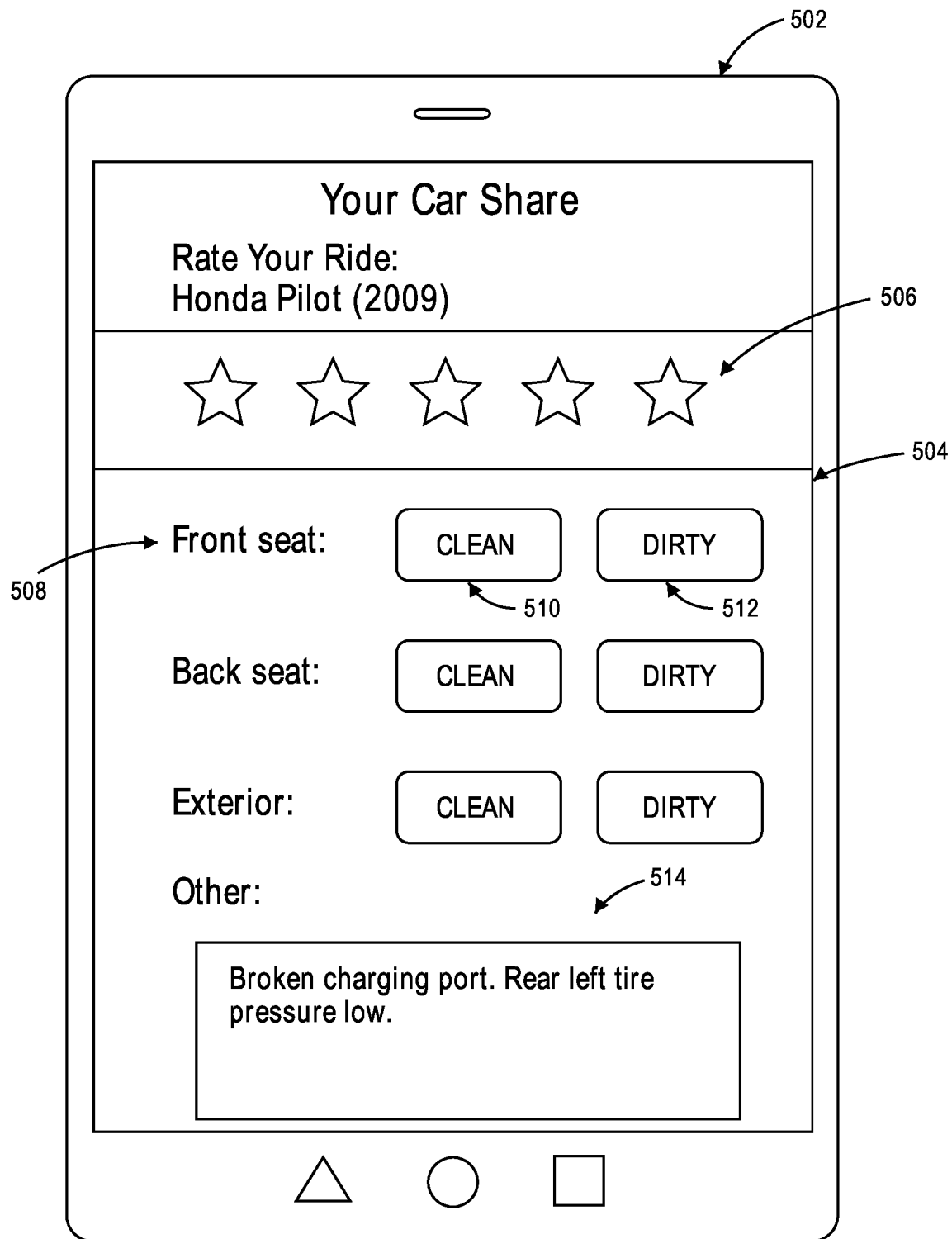
FIG. 5 depicts an example user interface for collecting user feedback.

FIG. 5 depicts an example computing environment 500 for soliciting and collecting user feedback as part of a car share rating application, according to an embodiment. The environment 500 includes a computing device 502 which may correspond to the computing device 402 of FIG. 4. The device 502 includes a screen 504, which may correspond to the screen 404 of FIG. 4. The screen 504 includes a description portion and a star rating region 506. The star rating region 506 may be selectable by the user, so that the user is able to rate car sharing purchase (e.g., the car sharing purchase of a Honda Pilot, according to the depicted example). As noted above, vehicles other than passenger vehicles are supported by the CSP and thus, any vehicle type may be displayed in the screen 504. Also, a form of rating other than a star rating (e.g., a sliding scale rating, a thumbs-up/thumbs-down rating, etc.) may be used in some embodiments. The user may select a star rating from the star rating region 506 according to the user's perception of the overall rating of the vehicle 102.

In some embodiments, the screen 504 may display one or more quality markers 508 that permit the user to signify a state of the vehicle. For example, a quality marker may include a Boolean button such as a favorable button 510 and an unfavorable button 512, as depicted in FIG. 5. Other types of input widgets (e.g., sliders, radio boxes, check boxes, etc.) may be supported by the graphical user interface displayed in the screen 504. The screen 504 may also include a free-form text area 514, wherein a user may type notes. The user's notes may be analyzed by a remote computing device (e.g., the server 108) using natural language processing, to infer meaning and to update the virtual model of the vehicle 102. Once the user has selected one or more of the quality markers 508, the user may be prompted to submit the user's selections as feedback. In other embodiments, the selections may be transmitted automatically in response to the user's selections. As discussed with respect to FIG. 1, the remote computing device may process the user's selections and update the virtual model of the vehicle based on the user's selections. For example, a service-related imperative may be associated with the virtual model based one or more of the user selections indicating that the vehicle 102 is in need of a particular service.

In an embodiment, the remote computing device may include functionality for issuing a reward to the user in response to the user's selection of the unfavorable button 512, followed by subsequent agreement, via the mobile device 504, to rectify the unfavorable condition. For example, the remote computing device may receive the user's indication that the back seat of the vehicle is dirty. The remote computing system may, in response to receiving the user's indication, issue an action message to the device 502, offering the user a reward for cleaning the back seat. If the user accepts, then the remote computing device may receive a confirmation of the cleanliness of the vehicle 102 from the next user of the vehicle 102. When the remote computing device receives the confirmation from the next user, the remote computing system may credit the user's CSP account.

Example Method

Figure 6:
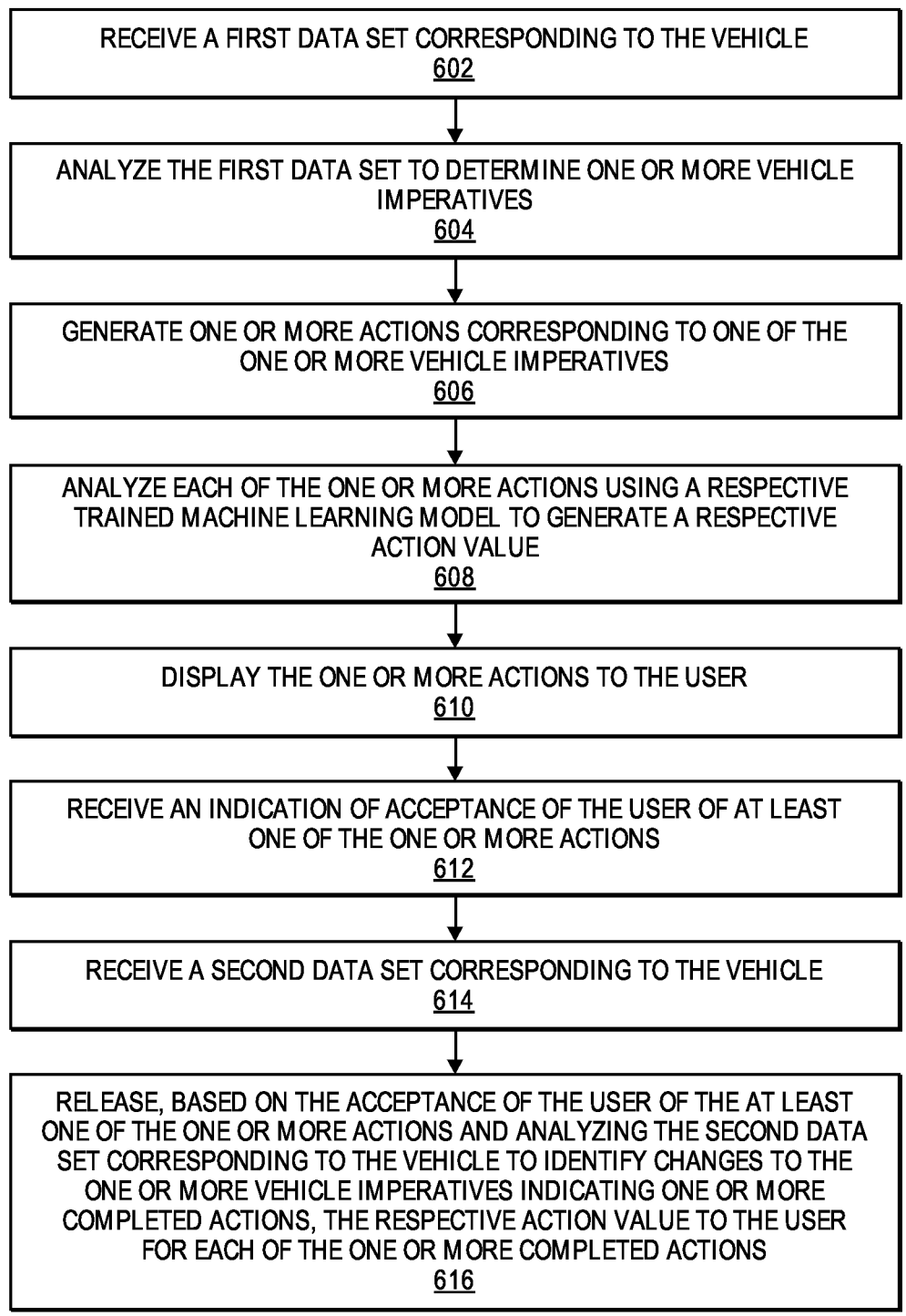
FIG. 6 depicts an example method of causing a user of a car sharing platform to perform an action with respect to a vehicle, according to one embodiment and scenario.

FIG. 6 depicts an example method 600 of causing a user of a car sharing platform to perform an action with respect to a vehicle. The method 600 may include receiving a first data set corresponding to the vehicle (block 602). For example, the first data set may be a vehicle telematics data set, produced by the telematics system 104, where the vehicle corresponds to the vehicle 102. The first data set may be received in the server 108, for example, via the network 106. In an embodiment, the first data set may be received by the processor in the telematics system 104, and analyzed further in the telematics system 104 without the use of the server 108. In an embodiment, the first data set may correspond to a historical data set used by the relocation module 178. A module of the telematics system 104, such as the processing module 132, or the server 108, such as the state module 170, may analyze the telematics data to determine one or more vehicle imperatives (block 604). For example, the state module 170 may include a library for reading telematics data in chunks, and rules for determining when the telematics data includes variables or values that are outside of an acceptable range (e.g., a tire pressure measurement of a particular PSI). A collection of variables or values that are in need of correction, in a service context, are vehicle imperatives. Vehicle imperatives may also include non-service related items, such as relocating a vehicle from one point to another, as discussed above.

The method 600 may include generating, based on the one or more vehicle imperatives, one or more actions, each action corresponding to one of the one or more vehicle imperatives (block 606). For example, as shown in FIG. 2, old engine oil resulted in an "oil change" action being generated. In a service context, when a value outside of the acceptable range is identified, the rules may include branching features to determine an action to take. For example when a value is too high, then the action may be to "lower the tire pressure by releasing 5 PSI." When a value is too low, then the action may be to "raise the tire pressure by adding 5 PSI." In some embodiments, a service-related action may be associated with a particular location or set of locations at which the service action can be performed. For example, air pressure adjustments may include all service stations. Oil pressure changes may be associated with all oil change locations, car dealerships, etc. Some embodiments may include functionality for routing the user to a particular location based on the action.

The method 600 may include analyzing each of the one or more actions using a respective trained machine learning model to generate a respective action value (block 608). As noted above, an individual ML model may be trained with respect to different action types. For example, in the relocation context, an ML model may be trained using historical user and vehicle demand data. The ML training module 164 may train an ML model to predict a minimum action value at which a user will accept a vehicle relocation action. The minimum value may be compared to a profit that the CSP will realize if the vehicle is relocated, and if the profit exceeds the minimum value, then the CSP may display the one or more actions to the user, such as by transmitting an action message to a mobile computing device of the user (block 610).

The method 600 may include receiving an indication of acceptance of the user of at least one of the one or more actions. For example, as discussed with respect to FIG. 2 and FIG. 3, the user may interact with a computing device to cause an indication of acceptance to be received. The indication may be transmitted to the server 108, wherein the user's acceptance may be recorded. The method 600 may include receiving a second data set (e.g., additional telematics data, user data as in FIG. 5, GPS data from the GPS 128, etc.) (block 614). The method 600 may include analyzing the second data set corresponding to the vehicle to identify changes to the one or more vehicle imperatives indicating one or more completed actions, and releasing a respective action value for each of the one or more completed actions of the user (block 616). For example, once the server determines that the user has accepted one or more actions, the server 108 may periodically check additional data (e.g., the location of the vehicle 102, data received from the sensor 134, vehicle telematics data, etc.) to determine whether a change to the vehicle imperative corresponding to the accepted action has occurred. Once the change is detected (e.g., the user relocated the vehicle, added air to the tires, cleaned the back seat of the vehicle, dropped the vehicle off for an oil change, etc.), then credits may be issued to an account of the user, or a promotional code for a discount may be transmitted to the user by email, or the user may be compensated in another way. It should be appreciated that many types of actions are envisioned, as are many types of potential incentives/rewards, and that those discussed herein are intended to be simplified for discussion purposes.

Example Mobile Application

In general, the techniques herein (e.g., the method 600) may be implemented using a combination of one or more clients and/or one or more server devices. For example, depending on the hardware and software implementation chosen by an implementer, the method 600 may be entirely implemented using a single computing device (e.g., the telematics system 104). Increasingly, software developers are using user interface frameworks to build applications that allow application data, structure, state, behavior, and styling to be independently designed and managed. React.js and Angular are two popular application platforms for creating mobile applications, for example.

The user interface framework may be entirely contained within a module of the telematics system 104 of FIG. 1. For example, the user interface framework may be included in a mobile application (e.g., Android or iPhone application) downloadable from an application store which is stored in the memory 122 and is executed by the processor 120. In some embodiments, the user interface framework may generate a mobile application that is deployed in the telematics system 104. The user interface framework may associate the structure of one or more user interfaces with respective behavior, styling, state, and data bindings.

The user interface framework may define a structure, or a "shell" of one or more user interfaces. For example, the user interface framework may define separate structure for the user interfaces displayed in the respective screens (e.g., screen 404 and screen 504, for example).

In a first example of the user interface framework defining user interface structure, the screen 204 of FIG. 2 may be implemented using the user interface framework. The structure of the user interface 200 may include the rows and columns of data comprising FIG. 2, lacking the labels, map data, and action messages depicted in FIG. 2.

In a second example of the user interface framework defining user interface structure, the push notification 306 of FIG. 3 may be implemented using the user interface framework to have its own structure that differs from the structure of the user interface 200, such as a container for the user interface 306 (e.g., a rectangular region including three boxes) and containers for the yes/no buttons 314. The containers may be associated with styling, state, and behavior that are independently configurable via the user interface framework.

As noted, the structure of the respective user interfaces defined by the user interface framework may include a series of heterogeneous components that are simple or complex structures (e.g., buttons, notification overlays, typographical structures, mapping elements, a row of components, a column of components, etc.). These components may be nested. The user interface framework may include data bindings, wherein the user interface framework automatically inserts data into the individual components included in the structure of a user interface. The inserted data may be received/retrieved from a local or remote source (e.g., the server 108) and may be added to the existing structure of a user interface. The mobile application may include instructions for receiving the trip data at particular times, and/or in response to the presence of certain conditions. For example, data may be received in real-time, periodically, once when the mobile application is first accessed by the user, etc. In other embodiments, the user interface framework may receive data pushed by the server 108 (e.g., in response to a scheduled job, push notification message, etc.).

Components may include an identifier that allows them to be bound, styled, and unambiguously referenced by the user interface framework. For example, a simple example of a data binding is the destination name "ABC Grocery" in the trip description region 206 of FIG. 2. That name may be associated with an id="destination-name". A corresponding data element in a data structure bound to the user interface of the screen 204 may include a data element labeled "ABC Grocery" of type string. The user interface framework may include instructions for binding the data element "ABC Grocery" to the text area, such that whenever data with the label "destination-name" is received, the value of the text area depicting the destination name is always updated. Data bindings may have types, and components may be templated so that the value of data received may be interpolated. The user interface framework may bind different types (e.g., strings, integers, etc.) to graphical representations, so that raw numeric data may be displayed as rich graphics (e.g., maps). Similarly, the data binding may include instructions for modifying the display of particular items.

For example, data defining the offers region 208 may be received as a list data structure. The data binding of the action messages in the offers regions 208 may include instructions for looping through the list data via a programming loop (e.g., a while loop, for loop, etc.) and inserting each action message at an appropriate position within the structure of the screen 204, and for formatting the data composing the action message in a standard display format (e.g., action name, detour, discount).

The user interface framework may include aspects of behavior information and state information as well. For example, the behavior information may include computer instructions that define, for example, which actions to take in response to a key press of a user transmitted to the application by a device such as the device 124. The state may define aspects of the user interface implemented by the user interface framework that may change over time, such as which (if any) of the panels 204-1 is currently selected, which user interface view is currently being displayed (e.g., the user interface 200 or the user interface 400), which trip or event the user clicked on last, etc. Although state and behavior are separately defined, they may interact. For example, the behavior implemented in response to a key press may depend on which user interface is currently displayed.

In an embodiment, the method 500 may be performed by a mobile application that includes, or is generated by, the above-described user interface framework. At block 502, the trip data may be received by the mobile application from a remote API (e.g., the API 180 of FIG. 1). Generating the graphical user interface at block 504 may include rendering the structure defined by the user interface framework, including the set of driver information panels 204-1 (e.g., as one or more an HTML output files). Plotting the set of trips of the vehicle at block 506 may include evaluating a data binding, wherein one or more of the trips 220 are inserted into the structure of the user interface 200, and applying styling to the graphical user interface. Displaying the graphical user interface at block 508 may be performed by calling a render function of the user interface framework which outputs complete or partial HTML/JavaScript/CSS files corresponding to the mobile application. Receiving a user selection at block 510 may occur after the mobile application is fully rendered, and may include a click, key press, touch selection, etc. as discussed above. Receiving the user selection may include executing additional behavior instructions that may, for example, retrieve/receive additional information corresponding to the user selection and display that additional information as shown at block 512.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the term "set" may include a collection of one or more elements.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of causing a user of a car sharing platform to perform service or relocation actions with respect to a vehicle, the method comprising:

training, by one or more processors, a plurality of artificial neural network models by analyzing historical data, wherein each model is trained to generate respective action values for actions corresponding to respective vehicle imperative types, at least one of the plurality of artificial neural network models trained to generate action values for actions corresponding to a non-relocation vehicle imperative type;

analyzing, by the one or more processors, a first data set to determine one or more vehicle imperatives, each comprising one or more respective actions;

generating, by the one or more processors, a respective action value for each of the respective actions corresponding to the determined one or more vehicle imperatives by analyzing each of the respective actions using a respective one of the plurality of trained artificial neural network models according to a vehicle imperative type associated with each of the one or more respective actions;

displaying, by the one or more processors, the one or more respective actions to the user;

receiving, by the one or more processors, an indication of acceptance of the user of at least one of the one or more actions;

analyzing, by the one or more processors, a second data set to identify changes to the one or more determined vehicle imperatives, indicating one or more completed actions; and releasing, by the one or more processors and based on the analyzing of the second data set and the acceptance of the user, the respective action value to the user for each of the one or more completed actions.

2. The computer-implemented method of claim 1,
wherein the first data set is a vehicle telematics data set, and
wherein the second data set is a vehicle telematics data set.

3. The computer-implemented method of claim 1,
wherein the first data set is a user data set, and
wherein the second data set is a user data set.

4. The computer-implemented method of claim 1,
wherein analyzing the first data set to determine one or more vehicle imperatives includes determining a vehicle service imperative.

5. The computer-implemented method of claim 1,
wherein analyzing the first data set to determine one or more vehicle imperatives includes determining a relocation service imperative.

6. The computer-implemented method of claim 1, further comprising:
applying a respective set of rules to each of the one or more determined vehicle imperatives.

7. The computer-implemented method of claim 1, further comprising:
analyzing historical action acceptances of the user.

8. The computer-implemented method of claim 1,
wherein displaying the one or more actions to the user includes displaying the one or more actions to the user while the user is operating the vehicle at rest.

9. The computer-implemented method of claim 1,
wherein displaying the one or more actions to the user includes transmitting the one or more actions to a mobile computing device of the user via a push message.

10. The computer-implemented method of claim 1,
wherein the user is a first user and wherein receiving the second data set includes receiving the second data set from the vehicle when the vehicle is being operated by a second user.

11. A non-transitory computer readable medium containing program instructions that when executed, cause a computer system to:
train, by one or more processors, a plurality of artificial neural network models by analyzing historical data, wherein each model is trained to generate respective action values for actions corresponding to respective vehicle imperative types, at least one of the plurality of artificial neural network models trained to generate action values for actions corresponding to a non-relocation vehicle imperative type;
analyze, by the one or more processors, a first data set to determine one or more vehicle imperatives, each comprising one or more respective actions;
generate, by the one or more processors, a respective action value for each of the respective actions corresponding to the determined one or more vehicle imperatives by analyzing each of the respective actions using a respective one of the plurality of trained artificial neural network models according to a vehicle imperative type associated with each of the one or more respective actions;
display, by the one or more processors, the one or more respective actions to a user;
receive, by the one or more processors, an indication of acceptance of the user of at least one of the one or more actions;
analyze, by the one or more processors, a second data set to identify changes to the one or more determined vehicle imperatives, indicating one or more completed actions; and
release, by the one or more processors and based on the analyzing of the second data set and the acceptance of the user, the respective action value to the user for each of the one or more completed actions.

12. The non-transitory computer readable medium of claim 11,
wherein the first data set is a vehicle telematics data set, and
wherein the second data set is a vehicle telematics data set.

13. The non-transitory computer readable medium of claim 11,
wherein the first data set is a user data set, and
wherein the second data set is a user data set.

14. The non-transitory computer readable medium of claim 11, containing further program instructions that when executed, cause a computer system to:
analyze the first data set to determine a vehicle service imperative.

15. The non-transitory computer readable medium of claim 11, containing further program instructions that when executed, cause a computer system to:
analyze the first data set to determine a relocation service imperative.

16. The non-transitory computer readable medium of claim 11, containing further program instructions that when executed, cause a computer system to:
apply a respective set of rules to each of the one or more determined vehicle imperatives.

17. The non-transitory computer readable medium of claim 11, containing further program instructions that when executed, cause a computer system to:
analyze historical action acceptances of the user.

18. The non-transitory computer readable medium of claim 11, containing further program instructions that when executed, cause a computer system to:
display the one or more actions to the user while the user is operating the vehicle at rest.

19. The non-transitory computer readable medium of claim 11, containing further program instructions that when executed, cause a computer system to:
transmit the one or more actions to a mobile computing device of the user via a push message.

20. The non-transitory computer readable medium of claim 11, containing further program, instructions that when executed, cause a computer system to:
release credits for a car sharing platform to an account of the user.

* * * * *

UNITED STATES PATENT AND TRADEMARK OFFICE
CERTIFICATE OF CORRECTION

PATENT NO. : 11,556,949 B2
APPLICATION NO. : 17/387583
DATED : January 17, 2023
INVENTOR(S) : Joseph Robert Brannan et al.

Page 1 of 1

It is certified that error appears in the above-identified patent and that said Letters Patent is hereby corrected as shown below:

In the Claims

At Column 26, Line 56, "program," should be -- program --.

Signed and Sealed this
Twenty-first Day of May, 2024

Katherine Kelly Vidal
*Director of the United States Patent and Trademark Office*